(12) United States Patent
Lee et al.

(10) Patent No.: US 10,160,398 B2
(45) Date of Patent: Dec. 25, 2018

(54) TWO-WHEELED TRANSPORT FIXING APPARATUS FOR PICKUP TRUCK

(71) Applicants: Hyundai Motor Company, Seoul (KR); Seojin Industrial Co., Ltd., Gunpo-si (KR)

(72) Inventors: Sang Heon Lee, Seoul (KR); Chang Dong Kim, Suwon-si (KR); Geon Hee Cheon, Gunpo-si (KR)

(73) Assignees: Hyundai Motor Company, Seoul (KR); Seojin Industrial Co., ltd., Gunpo-si (KR)

( * ) Notice: Subject to any disclaimer, the term of this patent is extended or adjusted under 35 U.S.C. 154(b) by 64 days.

(21) Appl. No.: 15/364,641

(22) Filed: Nov. 30, 2016

(65) Prior Publication Data

US 2018/0099620 A1   Apr. 12, 2018

(30) Foreign Application Priority Data

Oct. 6, 2016   (KR) .......................... 10-2016-0129263

(51) Int. Cl.
*B60R 9/10* (2006.01)
*B60P 3/077* (2006.01)

(52) U.S. Cl.
CPC ............... *B60R 9/10* (2013.01); *B60P 3/077* (2013.01)

(58) Field of Classification Search
CPC ............. B60P 3/077; B60P 3/075; B60R 9/10
USPC ........................................ 224/403, 404, 405
See application file for complete search history.

(56) References Cited

U.S. PATENT DOCUMENTS

| 3,116,836 | A | * | 1/1964 | McCauley | B62H 3/08 211/21 |
| 4,826,061 | A | * | 5/1989 | Heideman | B60R 9/045 224/321 |
| 4,852,779 | A | * | 8/1989 | Berg | B25H 1/0014 211/21 |
| 4,921,152 | A | * | 5/1990 | Kemming | B60R 9/10 211/5 |
| 5,560,666 | A | * | 10/1996 | Vieira | B60P 3/40 224/402 |
| 5,833,074 | A | * | 11/1998 | Phillips | B60R 9/10 211/21 |
| 6,095,731 | A | * | 8/2000 | Minakami | B61D 45/001 410/10 |
| 6,755,599 | B1 | * | 6/2004 | Plyler | B60P 3/077 211/21 |
| 7,051,909 | B2 | | 5/2006 | Gibson | |
| 7,857,177 | B2 | | 12/2010 | Reeves et al. | |
| 9,022,265 | B2 | | 5/2015 | Wolfe et al. | |
| 9,186,540 | B2 | * | 11/2015 | Bass | A63B 22/0605 |
| 9,610,993 | B1 | * | 4/2017 | Ho | B62H 3/08 |
| 2007/0273194 | A1 | * | 11/2007 | Fraser | A47C 7/383 297/397 |

(Continued)

FOREIGN PATENT DOCUMENTS

| KR | 10-2011-0050162 | 5/2011 |
| KR | 20-2011-0008044 | 8/2011 |

*Primary Examiner* — Derek Battisti

(74) *Attorney, Agent, or Firm* — Morgan, Lewis & Bockius LLP (57) ABSTRACT

Disclosed is a two-wheeled transport fixing apparatus for pickup trucks, which is configured to fix a wheel of a two-wheeled transport loaded into a cargo box of a pickup truck, th fixing apparatus being removable from the cargo box.

13 Claims, 10 Drawing Sheets

(56) References Cited

U.S. PATENT DOCUMENTS

2012/0325877 A1\* 12/2012 Franks ................... B60R 11/06
                                                      224/404
2013/0270201 A1\* 10/2013 Vineyard ................ B62H 3/06
                                                      211/21

\* cited by examiner

TWO-WHEELED TRANSPORT FIXING APPARATUS FOR PICKUP TRUCK

CROSS-REFERENCE TO RELATED APPLICATION

The present application claims priority to Korean Patent Application No. 10-2016-0129263, filed on Oct. 6, 2016, the entire contents of which is incorporated herein for all purposes by this reference.

BACKGROUND OF THE INVENTION

Field of the Invention

The present invention relates to a two-wheeled transport fixing apparatus for pickup trucks, and more particularly, to a two-wheeled transport fixing apparatus for pickup trucks, which is configured in a kit form and is separably attached to a tailgate.

Description of Related Art

Generally, a pickup truck is provided on the rear portion thereof with an outwardly-opened cargo box. In order to load a two-wheeled transport (e.g. a bicycle or a motorcycle) into the cargo box, most conventional pickup trucks are mainly configured such that an apparatus for fixing a two-wheeled transport is integrally coupled with the cargo box so as not to be separable from the cargo box and is always exposed to the outside.

The conventional two-wheeled transport fixing apparatus that cannot be separated from the cargo box may disadvantageously reduce the space in the cargo box, and a worker may be injured when the worker collides with the fixing apparatus when loading cargo into the cargo box. In particular, the fixing apparatus is always exposed to the outside, thus creating an unpleasant external appearance and consequently deteriorating the marketability of a vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a two-wheeled transport fixing apparatus for pickup trucks, which is configured in a kit form and is separably attached to a tailgate, making better use of the space in a cargo box when it is not used, preventing the injury of a worker, and improving the marketability of a vehicle owing to the improved external appearance thereof.

In addition, various aspects of the present invention are directed to providing a two-wheeled transport fixing apparatus for pickup trucks, which may effectively fix all of various kinds of two-wheeled transports regardless of the width of wheels.

In accordance with one aspect of the present invention, the above and other objects can be accomplished by the provision of a two-wheeled transport fixing apparatus for a pickup truck, the apparatus including a case, a first side of which is open, a wheel cradle having a first end rotatably coupled to the case to move between a state of being accommodated in the case and a state of protruding from the case, and a support rod having a first end rotatably coupled to the wheel cradle and a remaining end supported by the case in a state in which the wheel cradle is rotated to protrude from the case, maintaining the wheel cradle in the rotated state.

The two-wheeled transport fixing apparatus may further include a wheel-fixing unit provided on the wheel cradle for fixing a wheel of a two-wheeled transport placed on the wheel cradle.

The support rod may be configured to be variable in length, and the support rod may be provided with a clamping unit so that variation in the length of the support rod is configured to be controlled by the clamping unit.

The two-wheeled transport fixing apparatus may further include a plurality of hooks provided on the case, and the hooks may be separably coupled with a strap that surrounds and fixes the two-wheeled transport.

The case may be mounted in a tailgate that configures a cargo box of the pickup truck, and the tailgate may be provided with an accommodation recess, into which the case is inserted to be removable.

The wheel cradle and the support rod may be exposed outward when the case is inserted into the accommodation recess so that the open side of the case coincides with a surface of the tailgate, and the wheel cradle and the support rod may not be exposed outward when the case is inserted into the accommodation recess so that the open side of the case is located at an inside of the accommodation recess and a closed surface of the case coincides with the surface of the tailgate.

The closed surface of the case may be provided with a handle that is used for removing the inserted case from the accommodation recess.

The wheel cradle may include a left cradle and a right cradle, which are spaced apart from each other in a left-and-right direction of a vehicle, and the left cradle and the right cradle may define a gap therebetween so that a wheel of a two-wheeled transport is located therebetween.

The wheel-fixing unit may include two wheel-fixing units provided respectively on the left cradle and the right cradle at positions facing each other.

The wheel-fixing unit may include a wheel-fixing block inserted into a guide groove formed in the wheel cradle to be movable along the guide groove, the wheel-fixing block having a front surface protruding outward from the guide groove to contact with a wheel of a two-wheeled transport to fix the wheel, a fastener including a screw mounted to penetrate the wheel cradle, the fastener having a first end fastened to the wheel-fixing block, and a knob integrally or monolithically coupled to a remaining end of the fastener, and the wheel-fixing block may move linearly along the guide groove when the knob and the fastener are rotated.

The support rod may include an outer rod having a first end rotatably coupled to the wheel cradle, the outer rod having a hollow shape, and an inner rod having a first end inserted into the outer rod and a remaining end separably supported by the case, the inner rod being configured to vary an overall length of the support rod by moving in a longitudinal direction of the outer rod.

The outer rod may have a cutting portion formed in a longitudinal direction thereof to enable movement of the inner rod when no tightening force is generated by the clamping unit and to restrain movement of the inner rod when tightening force is generated by the clamping unit.

The clamping unit may include a clip member having an arc-shaped portion for surrounding the outer rod and a pair of flange portions extending from first and second end portions of the arc-shaped portion to face each other, a tightening member having a pin portion penetrating the flange portions and a support portion coming into contact with the flange portion at a first end of the pin portion, and a lever member rotatably coupled to a remaining end of the pin portion to generate tightening force when coming into contact with the flange portion.

In accordance with another aspect of the present invention, there is provided a two-wheeled transport fixing apparatus for a pickup truck, which is mounted at a cargo box of the pickup truck and fixes a wheel of a two-wheeled transport, wherein the fixing apparatus is mounted to be removable from the cargo box, and the fixing apparatus includes elements used to fix the wheel, the elements being accommodated and mounted in the cargo box to be not exposed outward when not in use.

The cargo box may include a tailgate provided with an accommodation recess, the elements used to fix the wheel may be inserted into and mounted in the accommodation recess, and the elements may be inserted into the accommodation recess to be exposed outward only when used and to be not exposed outward when not in use.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a two-wheeled transport fixing apparatus for pickup trucks according to an exemplary embodiment of the present invention will be described with reference to the accompanying drawings.

Various embodiments of the present invention relates to an apparatus for fixing a wheel of a two-wheeled transport (e.g. a bicycle or a motorcycle) when such a two-wheeled transport is loaded into a cargo box provided on the rear portion of a pickup truck.

A two-wheeled transport fixing apparatus 1 for pickup trucks according to an exemplary embodiment of the present invention, as illustrated in FIGS. 1 to 10, includes a case 10, a first side of which is open, a wheel cradle 20 having a first end rotatably coupled to the case 10 to move between the state of being accommodated in the case 10 and the state of protruding from the case 10, a support rod 30 having a first end rotatably coupled to the wheel cradle 20 and a second end supported by the case 10 in the state in which the wheel cradle 20 is rotated to protrude from the case 10, maintaining the wheel cradle 20 in the rotated state, a wheel-fixing unit 40 provided on the wheel cradle 20 for fixing a wheel 111 of a two-wheeled transport 110 placed on the wheel cradle 20, and a clamping unit 50 provided on the support rod 30 to control variation in the length of the support rod 30.

Figure 1:
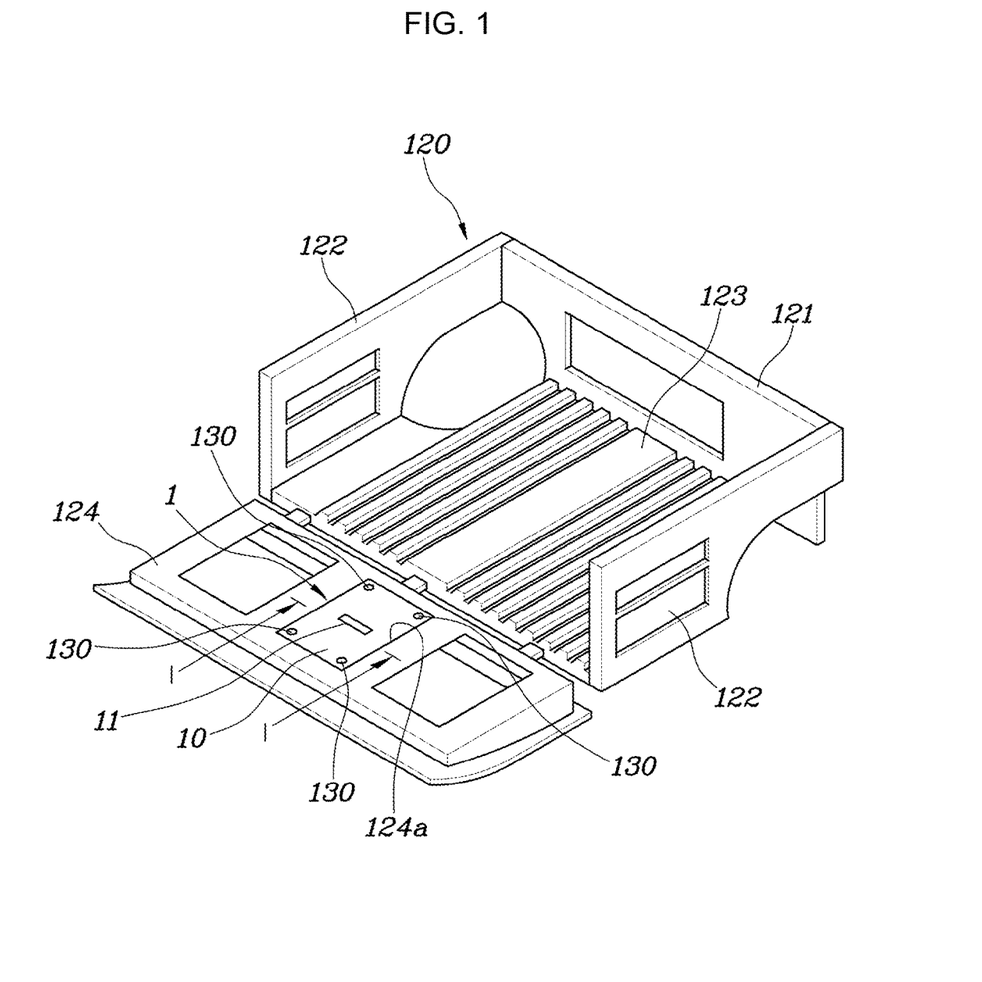
FIG. 1 is a view illustrating a two-wheeled transport fixing apparatus according to an exemplary embodiment of the present invention, which is mounted to a cargo box of a pickup truck, but is not in use.

A cargo box 120 of a pickup truck is defined by a front panel 121, a pair of side panels 122, a bottom panel 123, and a rotatably coupled tailgate 124, and has an outwardly open structure.

Figure 3:
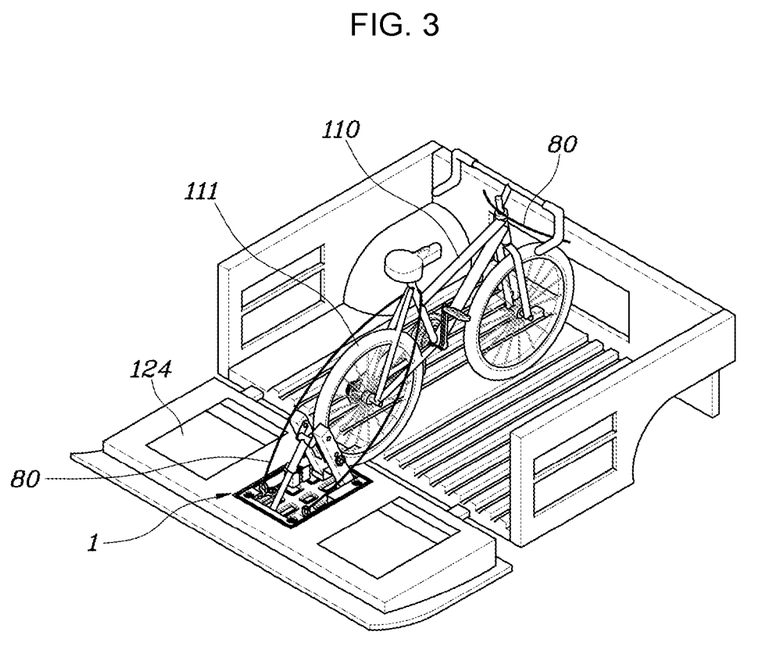
FIG. 3 is a view illustrating a state in which a wheel of a two-wheeled transport is fixed using the fixing device according to an exemplary embodiment of the present invention.
Figure 4:
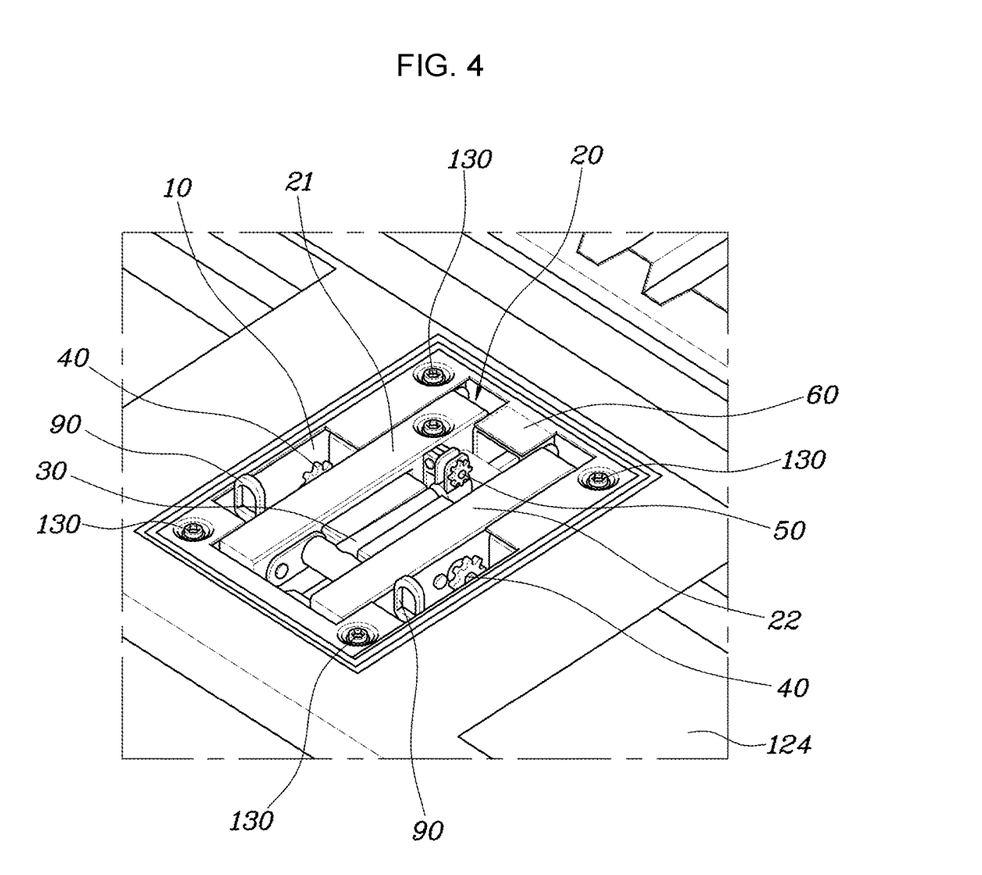
FIG. 4, FIG. 5, FIG. 6, FIG. 7, FIG. 8, FIG. 9, and FIG. 10 are views for explaining the two-wheeled transport fixing apparatus according to an exemplary embodiment of the present invention.
Figure 5:
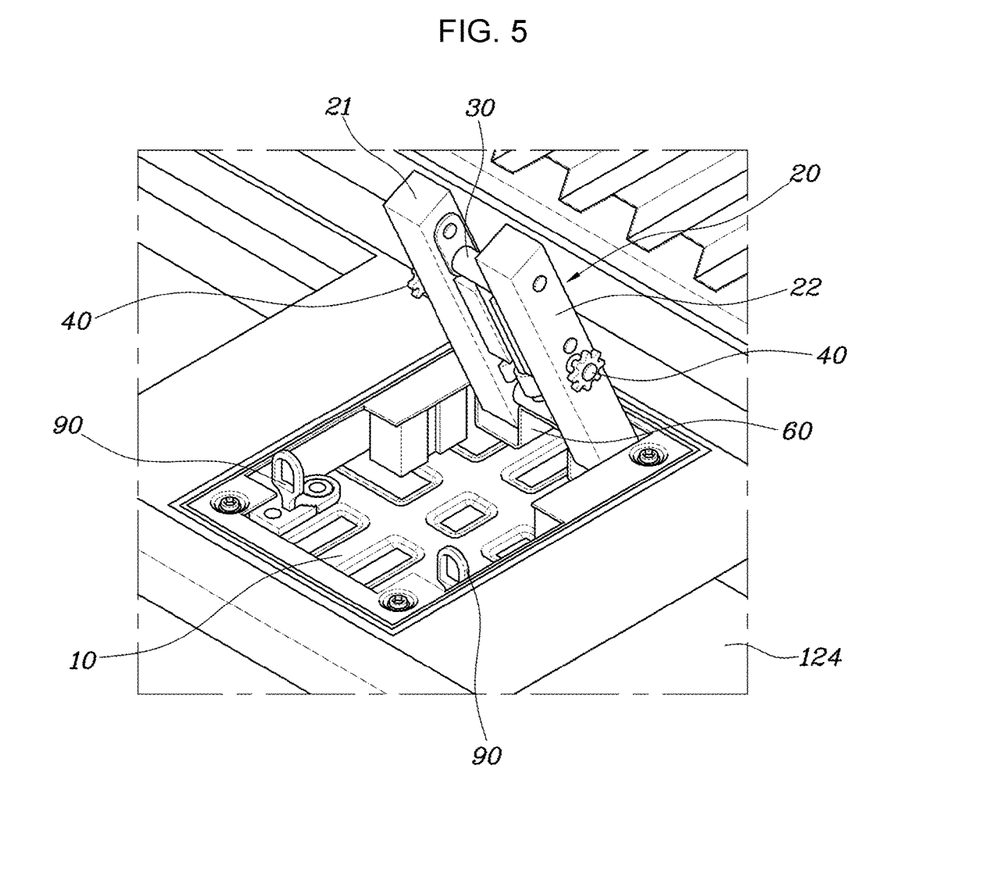
Figure 6:
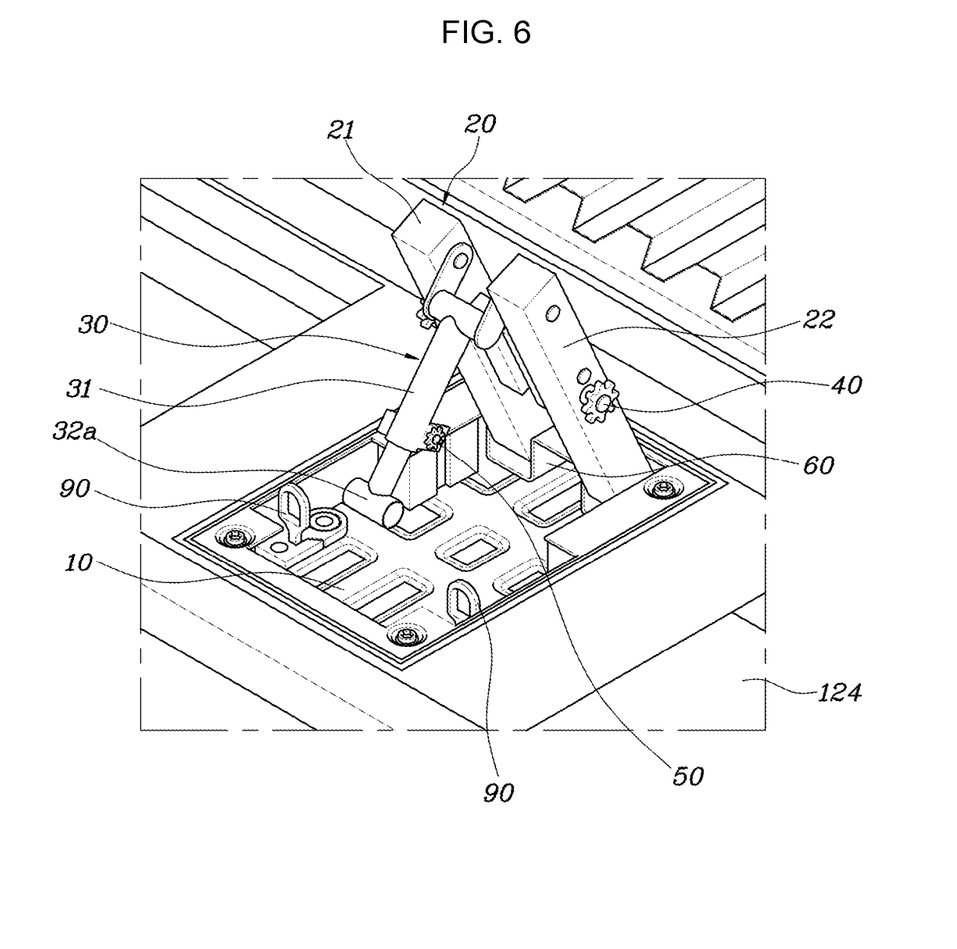
Figure 7:
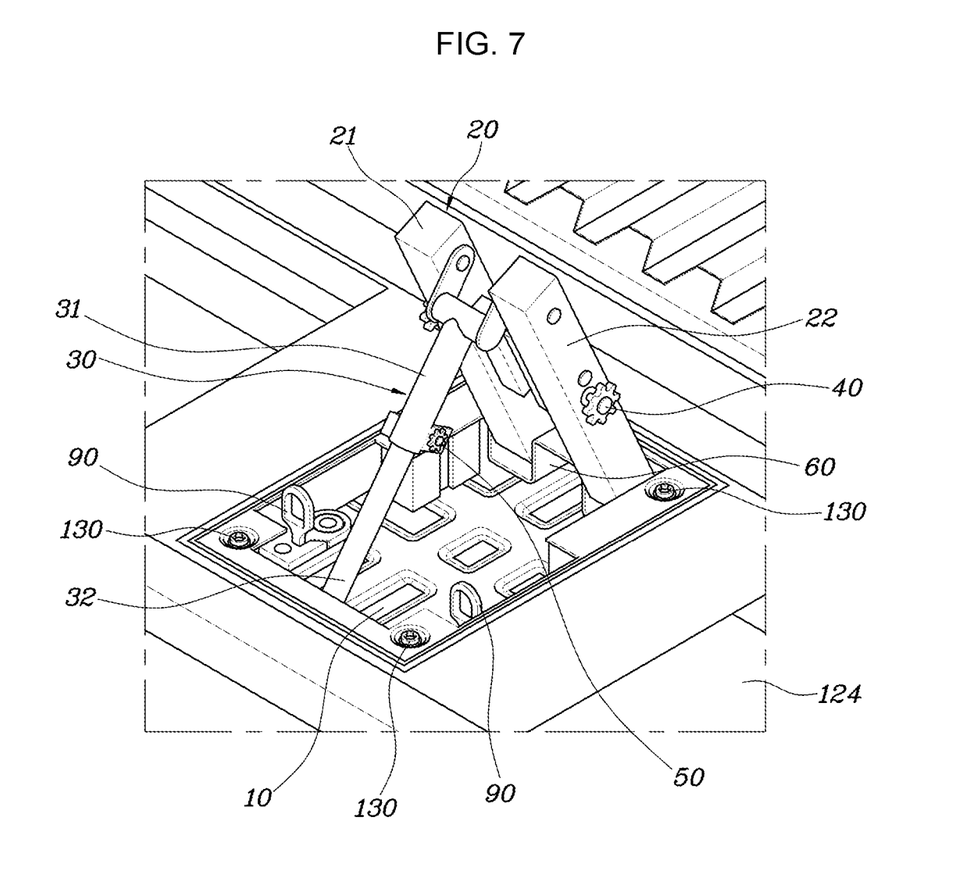
Figure 8:
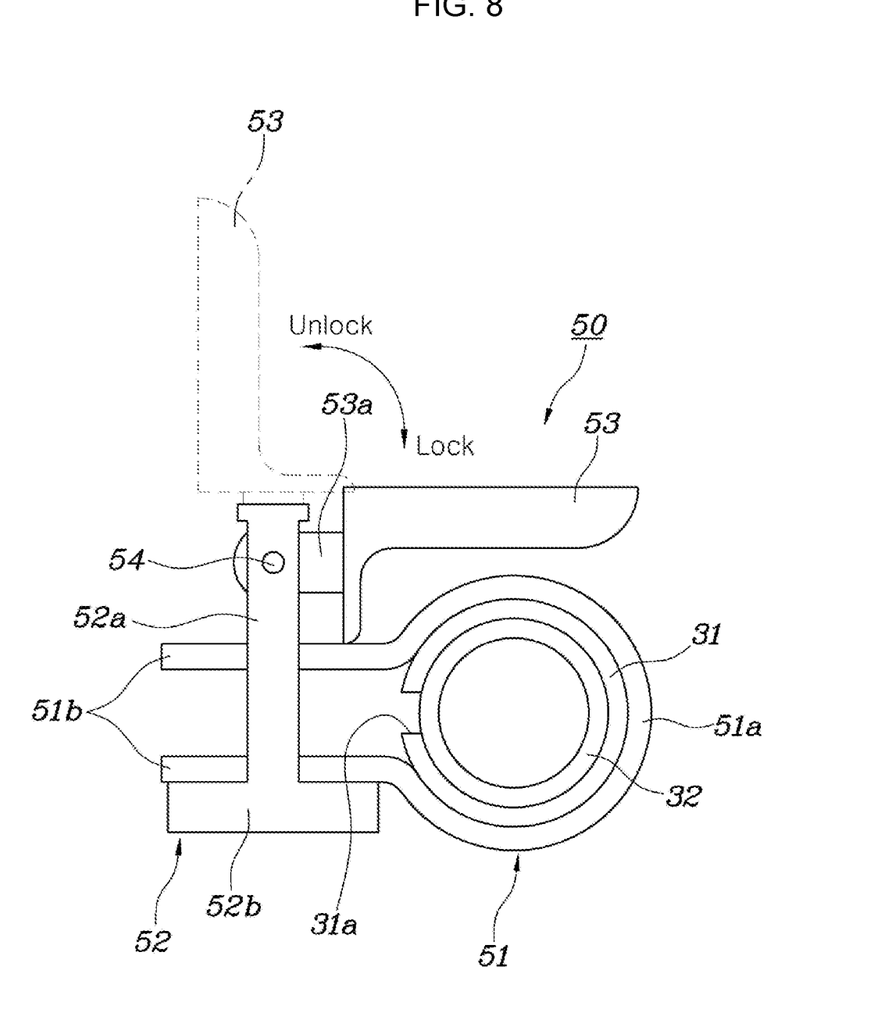
Figure 9:
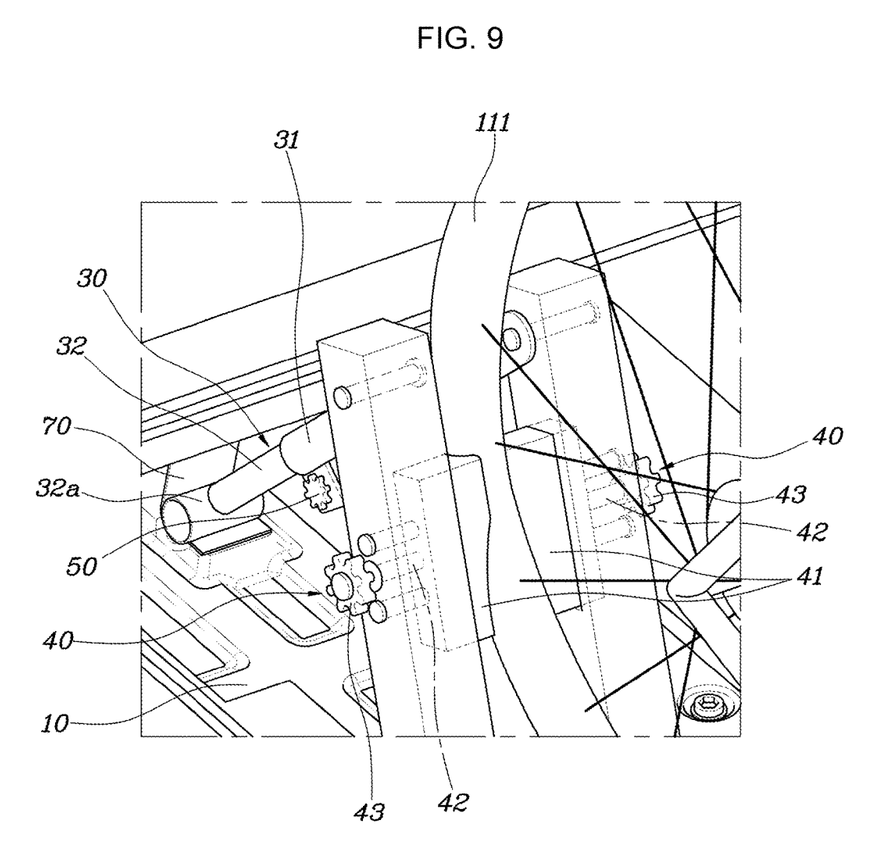
Figure 10:
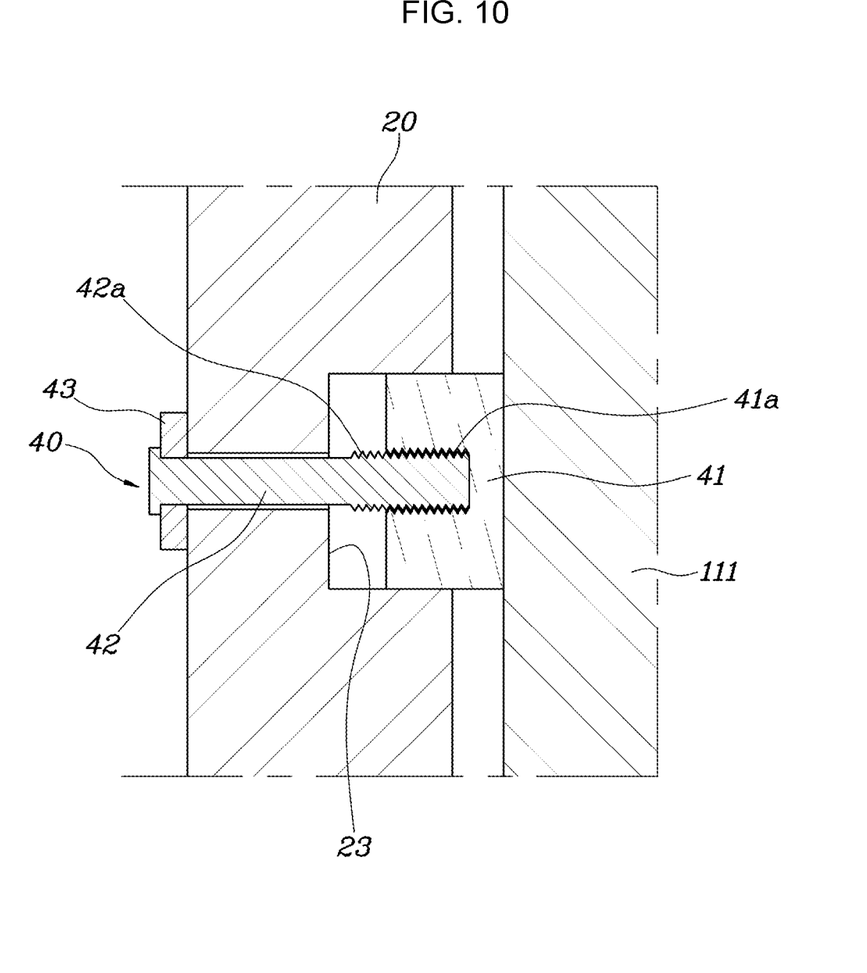

To load the two-wheeled transport 110 into the cargo box 120, the tailgate 124 is rotated rearward to be opened, and one of the wheels 111 of the two-wheeled transport 110 is positioned on the rearwardly rotated tailgate 124. The wheel 111 positioned on the tailgate 124 is fixed using the fixing apparatus 1 according to an exemplary embodiment of the present invention.

Figure 2:
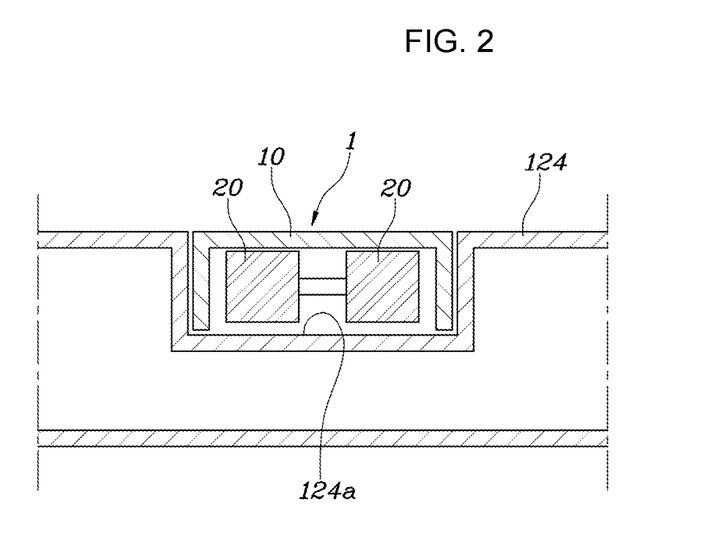
FIG. 2 is a sectional view taken along line I-I of FIG. 1.

To this end, the tailgate 124 is provided with an accommodation recess 124a having a predetermined size, and the two-wheeled transport fixing apparatus 1 is inserted into the accommodation recess 124a. In addition, the two-wheeled transport fixing apparatus 1 is mounted in a form of a separable structure to be removable from the accommodation recess 124a.

The case 10 is formed in a rectangular box, a first side of which is open, so that elements (e.g. the wheel cradle, the support rod, the wheel-fixing unit, and the clamping unit) used to fix the wheel 111 of the two-wheeled transport 110 are accommodated in the inner space of the rectangular box.

When the two-wheeled transport fixing apparatus 1 is not used, the open side of the case 10 is located at the inside of the accommodation recess 124a, and thus the closed side of the case 10 coincides with the surface of the tailgate 124, performing the function of the tailgate 124. At this time, because the elements mounted at the case 10 (e.g. the wheel cradle, the support rod, the wheel-fixing unit and the clamping unit) are not exposed to an outside, the availability of the space in the cargo box 120 may be increased, the injury of a worker may be prevented when the worker loads cargo into the cargo box 120, and the marketability of a vehicle may be improved owing to the improved external appearance.

When not in use, the two-wheeled transport fixing apparatus 1 inserted in the accommodation recess 124a may be fixed using a fixing element 130 including a bolt.

To use the two-wheeled transport fixing apparatus 1, the fixing element 130 is unfastened and the fixing apparatus 1, which is configured in a kit form, is removed from the accommodation recess 124a. Thereafter, the two-wheeled transport fixing apparatus 1 is inverted, and the case 10 thereof is inserted into the accommodation recess 124a so that the open side of the case 10 coincides with the surface of the tailgate 124. After insertion is completed, the fixing apparatus 1 is again fixed using the fixing element 130. With this process, the elements mounted at the case 10 (e.g. the wheel cradle, the support rod, the wheel-fixing unit, and the clamping unit) are exposed to an outside.

To allow the worker to easily remove the fixing apparatus 1 from the accommodation recess 124a, a handle 11 is provided on the closed side of the case 10.

In the state in which the case 10 is inserted into the accommodation recess 124a so that the elements mounted at the case 10 (e.g. the wheel cradle, the support rod, the wheel-fixing unit, and the clamping unit) are exposed to an outside, the wheel cradle 20 is rotated to protrude outward from the case 10.

A cradle bracket 60 is mounted and fixed to the case 10, and a first end of the wheel cradle 20 is rotatably hinge-coupled to the cradle bracket 60.

The wheel cradle 20 includes a left cradle 21 and a right cradle 22, which are spaced apart from each other in the left-and-right direction of a vehicle. Each of the left cradle 21 and the right cradle 22 has a first end rotatably coupled to the cradle bracket 60. The wheel 111 of the two-wheeled transport 110 is inserted into and located between the left cradle 21 and the right cradle 22, which are rotated to protrude outward from the case 10. The wheel 111 inserted between the left cradle 21 and the right cradle 22 is fixed by the wheel-fixing unit 40 provided on the wheel cradle 20.

After the wheel cradle 20 is rotated to protrude outward from the case 10, the support rod 30 is rotated away from the wheel cradle 20 so that an end of the support rod 30 is supported by the case 10. Accordingly, the wheel cradle 20 continues in the state of being supported by the support rod 30.

The support rod 30 is configured to be variable in length to adjust the angle at which the wheel cradle 20 is rotated.

That is, the support rod 30 includes a hollow outer rod 31 having a first end rotatably coupled to the wheel cradle 20, and an inner rod 32 having a first end inserted into the outer rod 31 and a second end separably supported by the case 10.

The inner rod 32 is inserted into a bore in the hollow outer rod 31 to be movable in a longitudinal direction of the outer rod 31. Accordingly, the overall length of the support rod 30 is variable.

A pipe-shaped support portion 32a is integrally or monolithically provided on the end of the inner rod 32, and a support bracket 70, which is curved in an arc shape, is mounted and fixed to the case 10 to support the support portion 32a.

After the overall length of the support rod 30 is adjusted, the support rod 30 is fixed via the manipulation of the clamping unit 50 provided on the support rod 30 so as not to be variable in length.

The inner rod 32 needs to be movable in a longitudinal direction of the outer rod 31 when no tightening force is generated by the clamping unit 50. In contrast, the inner rod 32 needs to be restrained so that movement thereof is impossible when tightening force is generated by the clamping unit 50. To this end, the outer rod 31 is provided with a cutting portion 31a in a longitudinal direction thereof.

That is, because a gap is present between the outer rod 31 and the inner rod 32 in the unlocked state of the clamping unit 50, the inner rod 32 is smoothly movable in a longitudinal direction of the outer rod 31. Because no gap is present between the outer rod 31 and the inner rod 32 in the locked state of the clamping unit 50, the inner rod 32 is restrained so that movement thereof is impossible.

The clamping unit 50 includes a clip member 51 having an arc-shaped portion 51a for surrounding the outer rod 31 and a pair of flange portions 51b extending from first and second end portions of the arc-shaped portion 51a to face each other, a tightening member 52 having a pin portion 52a penetrating the flange portions 51b and a support portion 52b coming into contact with the flange portion 41b at a first end of the pin portion 52a, and a lever member 53 rotatably coupled to a second end of the pin portion 52a to generate tightening force when coming into contact with the flange portion 51b.

The lever member 53 is provided with a protrusion 53a, which protrudes toward the pin portion 52a, and a lever pin 54 is coupled to penetrate the protrusion 53a and the pin portion 52a. Accordingly, the lever member 53 is rotatable about the lever pin 54.

The lever member 53 has an L-shaped form, and a first end of the lever member 53 functions as a manipulation portion that is manipulated by the worker, and a second end of the lever member 53 functions as a pressure portion that generates tightening force when coming into contact with the flange portion 51b.

After the support rod 30 is restrained via the manipulation of the clamping unit 50, the wheel 111 of the two-wheeled transport 110 is inserted between the left cradle 21 and the right cradle 22 and is fixed using the wheel-fixing unit 40.

The wheel-fixing unit 40 includes a wheel-fixing block 41, which is inserted into a guide groove 23 formed in the wheel cradle 20 to be movable along the guide groove 23 and has a front surface protruding outward from the guide groove 23 to contact with the wheel 111 of the two-wheeled transport 110 to fix the wheel 111, a fastener including a screw 42, which is mounted to penetrate the wheel cradle 20 and has a first end fastened to the wheel-fixing block 41, and a knob 43, which is integrally or monolithically coupled to a second end of the screw 42.

The guide groove 23 is formed in each of the left cradle 21 and the right cradle 22, and two wheel-fixing units 40 are respectively mounted at the left cradle 21 and the right cradle 22 at positions facing each other.

Screw threads 42a are provided on only a first end of the screw 42, which is coupled to the wheel-fixing block 41, and the wheel-fixing block 41 is provided with thread grooves 41a for the fastening of the screw threads 42a of the screw 42.

Accordingly, when the worker rotates the knob 43, the screw 42 is rotated along with the knob 43, and in turn the rotation of the screw 42 causes the wheel-fixing block 41 to receive rotation force. However, because the wheel-fixing block 41 inserted into the guide groove 23 cannot rotate, the wheel-fixing block 41 is configured to move linearly along the guide groove 23. Accordingly, the wheel 111 of the two-wheeled transport 110 inserted between the left cradle 21 and the right cradle 22 is supported at opposite sides thereof by the two wheel-fixing blocks 41 so that the position thereof is fixed.

The wheel-fixing unit 40 described above serves to adjust the distance between the wheel-fixing blocks 41, which are provided respectively in the left cradle 21 and the right cradle 22 as the worker manipulates the knob 43. Accordingly, all of various kinds of wheels 111 may be effectively fixed regardless of the width of the wheel, which may result in improved marketability.

The wheel-fixing block 41 may be formed of steel, or may be formed of a resin material including plastic or silicone, to prevent damage to the wheel 111, without limitation thereto.

After the wheel 111 is fixed using the wheel-fixing unit 40, a separate strap 80 may be additionally used to more firmly fix the two-wheeled transport 110 loaded into the cargo box 120.

That is, the case 10 according to an exemplary embodiment of the present invention includes a plurality of hooks 90, and the strap 80 is separably coupled to the hooks 90 to surround and fix the two-wheeled transport 110.

In addition, the body of the two-wheeled transport 110 is firmly fixed at the front side thereof by another strap 80.

As is apparent from the above description, a two-wheeled transport fixing apparatus according to an exemplary embodiment of the present invention serves to fix a wheel of a two-wheeled transport loaded into a cargo box of a pickup truck. When the fixing apparatus is not in use, elements used to fix the wheel (e.g. a wheel cradle, a support rod, a wheel-fixing unit and a clamping unit) are not exposed to an outside, which may increase the availability of the space in the cargo box, may prevent the injury of a worker when the worker loads cargo into the cargo box, and may improve the marketability of the vehicle owing to the improved extern appearance.

In addition, with a configuration in which the distance between wheel-fixing blocks, which are provided respectively in a left cradle and a right cradle, is adjustable, all of various kinds of two-wheeled transports may be effectively fixed regardless of the width of the wheel, which may result in improved marketability.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings.

The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A two-wheeled transport fixing apparatus for a pickup truck, the apparatus comprising:
    a case, a first side of which is open;
    a wheel cradle having a first end rotatably coupled to the case to move between a state of being accommodated in the case and a state of protruding from the case;
    a support rod having a first end rotatably coupled to the wheel cradle and a remaining end supported by the case in a state in which the wheel cradle is rotated to protrude from the case, maintaining the wheel cradle in the rotated state; and
    a wheel-fixing device provided on the wheel cradle for fixing a wheel of a two-wheeled transport placed on the wheel cradle,
    wherein the wheel-fixing device includes:
        a wheel-fixing block inserted into a guide groove formed in the wheel cradle to be movable along the guide groove, the wheel-fixing block having at least a discontinuous surface formed along a moving direction of the wheel-fixing block and a front surface protruding outward from the guide groove to contact with a wheel of a two-wheeled transport to fix the wheel;
        a fastener mounted to penetrate the wheel cradle, the fastener having a first end fastened to the wheel-fixing block; and
        a knob integrally coupled to a remaining end of the fastener,
    wherein the wheel-fixing block moves linearly along the guide groove when the knob and the fastener are rotated.

2. The apparatus according to claim 1, wherein
    the support rod is configured to be variable in length; and
    the support rod is provided with a clamping device so that variation in the length of the support rod is configured to be controlled by the clamping device.

3. The apparatus according to claim 1, further including a plurality of hooks provided on the case,
    wherein the hooks are separably coupled with a strap that surrounds and fixes the two-wheeled transport.

4. The apparatus according to claim 1, wherein
    the case is mounted in a tailgate that configures a cargo box of the pickup truck; and
    the tailgate is provided with an accommodation recess, into which the case is inserted to be removable.

5. The apparatus according to claim 4, wherein
    the wheel cradle and the support rod are exposed outward when the case is inserted into the accommodation recess so that an open side of the case coincides with a surface of the tailgate; and
    the wheel cradle and the support rod are not exposed outward when the case is inserted into the accommodation recess so that the open side of the case is located at an inside of the accommodation recess and a closed surface of the case coincides with the surface of the tailgate.

6. The apparatus according to claim 5, wherein the closed surface of the case is provided with a handle that is used for removing the inserted case from the accommodation recess.

7. The apparatus according to claim 1, wherein
    the wheel cradle includes a first cradle and a second cradle, which are spaced apart from each other in a predetermined direction of a vehicle; and
    the first cradle and the second cradle are configured to define a gap therebetween so that a wheel of a two-wheeled transport is located therebetween.

8. The apparatus according to claim 1, wherein the wheel-fixing device includes two wheel-fixing device provided respectively on the first cradle and the second cradle at positions facing each other.

9. The apparatus according to claim 2, wherein the support rod includes:
    an outer rod having a first end rotatably coupled to the wheel cradle, the outer rod having a hollow shape; and
    an inner rod having a first end inserted into the outer rod and a remaining end separably supported by the case, the inner rod being configured to vary an overall length of the support rod by moving in a longitudinal direction of the outer rod.

10. The apparatus according to claim 9, wherein the outer rod has a cutting portion formed in a longitudinal direction thereof to enable movement of the inner rod when no tightening force is generated by the clamping device and to restrain movement of the inner rod when tightening force is generated by the clamping device.

11. The apparatus according to claim 9, wherein the clamping device includes:
   a clip member having an arc-shaped portion for surrounding the outer rod and a pair of flange portions extending from first and second end portions of the arc-shaped portion to face each other;
   a tightening member having a pin portion penetrating the flange portions and a support portion coming into contact with the flange portion at a first end of the pin portion; and
   a lever member rotatably coupled to a remaining end of the pin portion to generate tightening force when coming into contact with the flange portion.

12. The two-wheeled transport fixing apparatus for the pickup truck according to claim 1, which is mounted at a cargo box of the pickup truck and fixes a wheel of a two-wheeled transport,
   wherein the fixing apparatus is mounted to be removable from the cargo box; and
   the fixing apparatus includes elements used to fix the wheel, the elements being accommodated and mounted in the cargo box to be not exposed outward when not in use.

13. The apparatus according to claim 12, wherein the cargo box includes a tailgate provided with an accommodation recess;
   the elements used to fix the wheel are inserted into and mounted in the accommodation recess; and
   the elements are inserted in the accommodation recess to be exposed outward when used and to be not exposed outward when not in use.

* * * * *